April 14, 1959  R. A. BUB ET AL  2,881,804
HOSE STIFFENER
Filed April 24, 1957
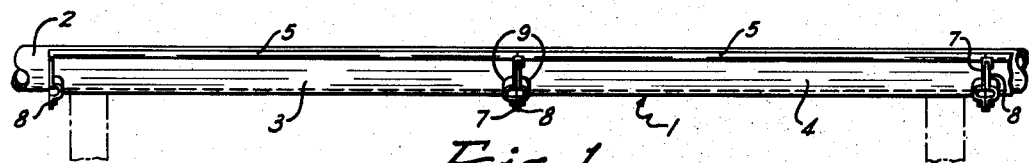
Fig. 1
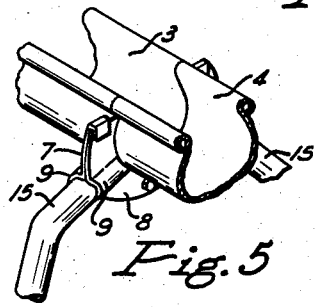
Fig. 3
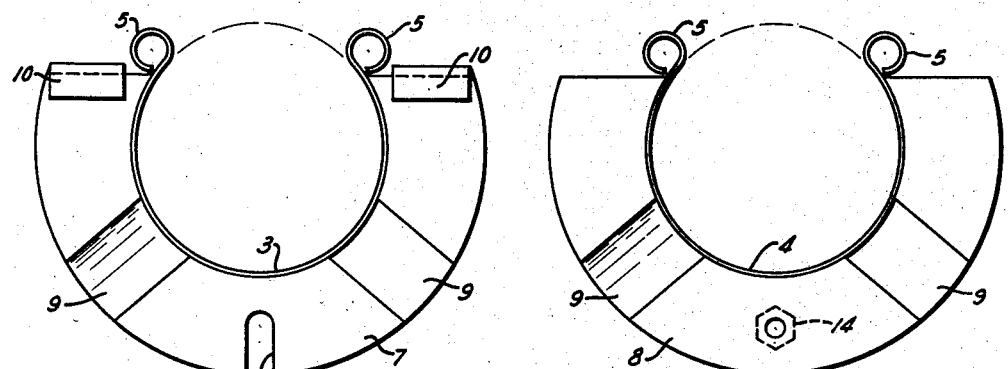
Fig. 4
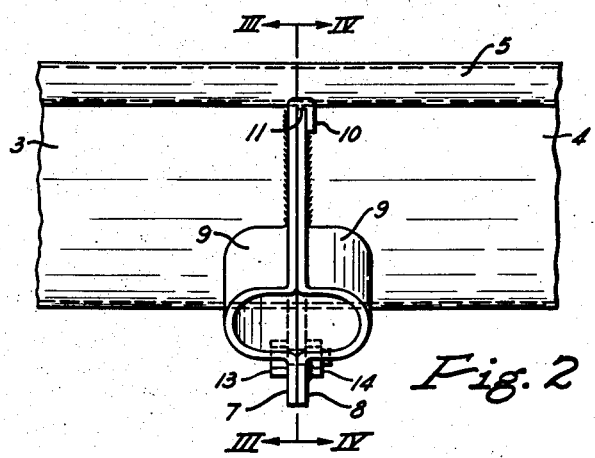
Fig. 5
Fig. 2
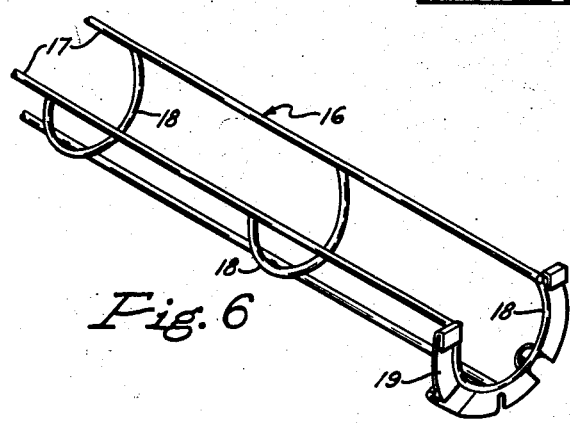
Fig. 6
INVENTORS
ROBERT A. BUB AND
JAMES J. SUMMERS
BY
Brown, Critchlow, Flick & Peckham
THEIR ATTORNEYS

2,881,804
HOSE STIFFENER

Robert A. Bub, Penn Township, and James J. Summers, Bethel Boro, Pa., assignors to Mine Safety Appliances Company, Pittsburgh, Pa., a corporation of Pennsylvania Application April 24, 1957, Serial No. 654,958

3 Claims. (Cl. 138—61)

This invention relates to stiffeners for flexible hoses, and more particularly to the joints in such stiffeners.

It sometimes is desirable to hold a section of a flexible hose either straight or in a predetermined curved contour. For example, large flexible hoses are often used with ships for supplying fluids or solids to them or for removing something from them. In the latter case, suction is applied to the hose, which may cause it to collapse and restrict the flow through it if any part of the hose is allowed to sag too sharply between spaced supports or if it is bent too sharply around any surface. Even when material is being forced through the hose under pressure, sharp bends in the hose will constrict it and interfere with flow.

It is among the objects of this invention to provide a stiffener for a flexible hose, which can be quickly applied to the hose to hold a section of it in a predetermined position, and which can be separated into short lengths for storage or handling when not in use.

In accordance with this invention, two or more trough-shaped splints are disposed end to end for receiving and confining a length of hose. Mounted on the adjoining ends of the splints are arcuate flanges, which are face to face and extend around the splints more than 180°. Each flange has a pair of circumferentially spread flexible portions bowed away from the adjoining flange. These bowed portions are not attached to the splints, whereby the flange is provided with enough flexibility to permit its ends to be spread farther apart to receive the hose. Means are provided for detachably connecting the flanges together rigidly, such as by turning back the ends of one of the flanges to provide recesses for the ends of the other flange, and by connecting a removable fastener to both flanges to prevent them from coming apart.

The invention is illustrated in the accompanying drawings, in which

Fig. 1 is a side view of the stiffener supporting a length of flexible hose between two supports;

Fig. 2 is an enlarged fragmentary side view showing a joint in the stiffener;

Figs. 3 and 4 are end views taken on the lines III—III and IV—IV, respectively of Fig. 2;

Fig. 5 is a fragmentary perspective view of a modification; and

Fig. 6 is a fragmentary perspective view of still another embodiment.

Referring to Fig. 1 of the drawings, a hose stiffener 1 is shown resting on a pair of spaced supports indicated in broken lines and representing the opposite sides of any open space that a hose must cross. The hose 2 that fits in the stiffener would sag down into the space between the supports if it were not for the stiffener. The stiffener between the two supports is formed from a pair of trough-shaped splints 3 and 4, each of which is only a few feet long so that it will be easy to handle and store when not in use. Generally, the splints will be straight lengthwise, but longitudinally curved splints can be used for controlling the curvature of a hose when that is necessary. Each splint is formed from a strip of sheet metal that is curved transversely somewhat more than 180°, but preferably not more than 280°, so that the splint and hose cannot come apart accidentally. The sheet metal is flexible enough to permit the edges of the splint to be spread far enough apart to admit or release the hose. To strengthen the splint lengthwise, as well as to facilitate admission of the hose to the splint, the longitudinal edges of the splint are rolled to form parallel beads 5. The hose can be laid along the top of these beads and then stepped on to press it down between them. The downward pressure of the hose against the beads will force them apart until the hose enters the trough, and then they will spring back toward each other.

The splints are held together and in alignment with each other by a joint that includes a pair of arcuate flanges 7 and 8. The flanges are rigidly mounted on the ends of the splints, such as by welding, and extend around them for more than 180°. Each flange has a pair of circumferentially spaced flexible portions 9 bowed away from the other flange. These bowed portions give the flanges considerable flexibility in that area, because the bowed portions are not attached directly to the splints, whereby the flanges will not interfere with spreading of the stiffener at the joint for insertion or removal of the hose.

Flange 7 has outwardly and downwardly bent upper ends 10 that form upwardly extending recesses 11 (Fig. 2) which snugly receive the ends of the other flange 8. With the ends of one flange folded over the ends of the other flange in this manner, the two flanges cannot come apart as long as they are in alignment. To restrain movement of the flanges relative to each other after the ends of flange 7 have been slipped down over the ends of the other flange, a fastening member is used. For this purpose, it is preferred that the recessed flange 7 be provided midway between its ends with an outwardly opening radial slot 12 (Fig. 3) to receive a bolt 13 projecting from the other flange. The bolt is provided with a nut 14, and by tightening the one on the other, the two flanges can be clamped tightly together so that their adjoining upper ends will be prevented from sliding apart. Either the bolt or the nut, but preferably the nut, may be welded to flange 8 so that it will not turn during tightening or loosening of the fastener. The slot 12 permits flange 7 to be slid down around the bolt at the same time that ends 10 slide down over the ends of the other flange. The fastener is then tightened to hold the flanges together.

If additional support is desired for the stiffener, legs 15, such as short lengths of pipe, can be inserted in the sockets formed by bowed portions 9, as shown in Fig. 5.

In the modification shown in Fig. 6, the stiffener joint is the same as that described above, but instead of forming each splint from a curved sheet metal strip, the splint 16 is formed from two or three parallel rods 17 that are connected together at longitudinally spaced intervals by arcuate rods 18 curved to about the same extent as the joint flange 19. The straight rods are located beside the ends of the flange and at its bottom, and they and the adjoining curved rod are welded to the flange.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A stiffener for a flexible hose of substantially the same diameter as the inside of the stiffener, comprising trough-shaped splints disposed end to end for receiving and confining a length of hose, arcuate flanges mounted on the adjoining ends of the splints face to face and extending around the splints more than 180°, each flange having a pair of circumferentially spaced flexible portions bowed away from the adjoining flange, said bowed portions being unattached to the splints to permit the ends of each flange to be spread farther apart to permit the hose to pass between said flange ends, and means detachably connecting the flanges together rigidly.

2. A hose stiffener according to claim 1, in which said connecting means include the ends of one of the flanges folded over the ends of the other flange to hold them face to face, and a removable fastener connecting the flanges to prevent their adjoining ends from sliding apart.

3. A stiffener for a flexible hose of substantially the same diameter as the inside of the stiffener, comprising trough-shaped splints disposed end to end for receiving and confining a length of hose, arcuate flanges mounted on the adjoining ends of the splints face to face and extending around the splints more than 180°, each flange having a pair of circumferentially spaced flexible portions bowed away from the adjoining flange, said bowed portions being unattached to the splints to permit the ends of each flange to be spread farther apart to permit the hose to pass between said flange ends, the ends of one of the flanges being folded over the ends of the other flange to hold them face to face, said one flange being provided about midway between its ends with an outwardly opening radial slot, a bolt supported by the other flange and extending through said slot, and a nut tightened on the bolt to clamp the flanges together.

References Cited in the file of this patent

UNITED STATES PATENTS

| | | |
|---|---|---|
| 228,253 | Finley | June 1, 1880 |
| 958,043 | Stockley | May 17, 1910 |
| 2,646,818 | Bimpson | July 28, 1953 |